(12) United States Patent
Moritani et al.

(10) Patent No.: US 11,587,777 B2
(45) Date of Patent: Feb. 21, 2023

(54) ANALYSIS DEVICE

(71) Applicant: SHARP KABUSHIKI KAISHA, Sakai (JP)

(72) Inventors: Masamitsu Moritani, Sakai (JP); Katsuhiko Kyuhken, Sakai (JP); Shohei Komaru, Sakai (JP); Tadashi Iwamatsu, Sakai (JP); Satoshi Morimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 12 days.

(21) Appl. No.: 17/225,558

(22) Filed: Apr. 8, 2021

(65) Prior Publication Data

US 2021/0335590 A1    Oct. 28, 2021

(30) Foreign Application Priority Data

Apr. 22, 2020  (JP) .............................. JP2020-076165

(51) Int. Cl.
    *H01J 49/00*    (2006.01)
    *H01J 49/28*    (2006.01)
    *G01N 27/622*   (2021.01)

(52) U.S. Cl.
    CPC .......... *H01J 49/282* (2013.01); *G01N 27/622* (2013.01)

(58) Field of Classification Search
    CPC .... H01J 49/00; H01J 49/0054; H01J 49/0422; H01J 49/08; H01J 49/02; H01J 49/282; G01N 27/622; G01N 27/624
    USPC ....................................... 250/281, 282, 288
    See application file for complete search history.

(56) References Cited

U.S. PATENT DOCUMENTS

| 6,633,144 B2* | 10/2003 | Barker ...................... H02P 1/18 318/400.42 |
| 7,985,949 B2* | 7/2011 | Rodier ................. G01N 27/622 250/281 |
| 2005/0205775 A1* | 9/2005 | Bromberg ........... H01J 49/0031 250/294 |
| 2006/0192492 A1* | 8/2006 | Ushifusa ................. H01J 29/04 315/161 |
| 2012/0318972 A1* | 12/2012 | Bream .................... H01J 49/34 250/288 |

(Continued)

FOREIGN PATENT DOCUMENTS

| JP | 2015-011837 A | 1/2015 |
| JP | 2019-186190 A | 10/2019 |

*Primary Examiner* — Jason L McCormack
(74) *Attorney, Agent, or Firm* — ScienBiziP, P.C.

(57) ABSTRACT

An analysis device includes an electron emission element, a collector, an electric field former, a power source, and a controller. The electron emission element includes a bottom electrode, a surface electrode, and an intermediate layer arranged between the bottom electrode and the surface electrode. The power source and the controller allow application of a voltage between the bottom electrode and the surface electrode. The electric field former forms an electric field in an ion movement region where anions directly or indirectly generated by electrons emitted from the electron emission element move toward the collector. The collector and the controller allow measurement of a current waveform of an electric current made to flow by arrival of anions at the collector. The controller regulates, based on the current waveform, a voltage applied between the bottom electrode and the surface electrode.

10 Claims, 8 Drawing Sheets

(56) References Cited

U.S. PATENT DOCUMENTS

2019/0302055 A1 10/2019 Komaru et al.

* cited by examiner

ANALYSIS DEVICE

BACKGROUND OF THE INVENTION

Field of the Invention

The present invention relates to an analysis device of an ion mobility-spectrometric type.

Description of the Background Art

Ion mobility spectrometry (IMS) is a technology for conducting a component analysis of a substance of interest by ionizing the substance and measuring the ion mobility in a gas, and uses, as an ionization source, a radioactive substance, corona discharge, deep ultraviolet, and the like. The radioactive substance, however, needs caution and supervision peculiar to the handling of such substance, and the corona discharge releases a high energy during the ionization to generate unnecessary ions and may change the substance to be measured in quality to adversely affect the measurement. In a method using deep ultraviolet, an ionizable subject is unfavorably restricted by the wavelength of an ultraviolet ray.

As an ionization method solving the problems as above, a soft ionization method using an electron emission element is proposed (see Japanese Unexamined Patent Application Publication No. 2015-011837, for instance), and a method using an electron emission element as an ionization source of an IMS analysis device is also proposed (see Japanese Unexamined Patent Application Publication No. 2019-186190, for instance). In the ionization by an electron emission element, an air component is initially ionized by electrons emitted from the electron emission element to generate primary ions. Then, the primary ions and a specimen gas are mixed together so as to ionize target molecules in the specimen gas by an ion molecule reaction.

On the other hand, the IMS is conventionally focused on the component analysis of a subject of measurement, and the absolute value of the ion content detected is not so emphasized as long as the difference in ion mobility is detectable. Because of a quick responsiveness of the IMS, however, it is being wanted to quantitatively measure the concentration, the change over time, and the like of a specimen gas component apart from conducting a component analysis on a specimen gas component.

The amount of primary ions generated by electrons emitted from an electron emission element varies depending on environmental conditions, such as the temperature and the humidity, and the life characteristics of the element even if a voltage is applied to the electron emission element under the same voltage application conditions. For this reason, the ionization capability of an analysis device varies depending on the environmental conditions, the life characteristics, and the like and the results of analysis are not stabilized. In addition, it is difficult to quantitatively measure a specimen gas component with a conventional IMS analysis device.

The present invention has been made in view of such circumstances and provides an analysis device capable of stabilizing the generation amount of primary ions and stabilizing the results of analysis.

SUMMARY OF THE INVENTION

The present invention provides an analysis device including an electron emission element, a collector, an electric field former, a power source, and a controller. The electron emission element includes a bottom electrode, a surface electrode, and an intermediate layer arranged between the bottom electrode and the surface electrode. The power source and the controller allow application of a voltage between the bottom electrode and the surface electrode. The electric field former forms an electric field in an ion movement region where anions directly or indirectly generated by electrons emitted from the electron emission element move toward the collector. The collector and the controller allow measurement of a current waveform of an electric current made to flow by arrival of anions at the collector. The controller regulates, based on the current waveform, a voltage applied between the bottom electrode and the surface electrode.

The power source and the controller are so provided as to allow application of a voltage between the bottom electrode and the surface electrode. As a result, it is possible to cause the electron emission element to emit electrons, and convert an air component into anions to generate primary ions. An ion molecule reaction of the primary ions with a component to be detected in a specimen gas makes it possible to convert the component to be detected into anions.

The electric field former is so provided as to form an electric field in an ion movement region where the generated anions move toward the collector. Moreover, the collector and the controller are so provided as to measure a current waveform of an electric current made to flow by arrival of anions at the collector. As a result, various species of anions as generated are separated from one another using the difference in ion mobility and detected as peaks of the current waveform.

The controller is so provided as to regulate, based on the current waveform, the voltage applied between the bottom electrode and the surface electrode. The peak height or the peak area of the current waveform represents the amount of ions arriving at the collector. Consequently, the generation amount of primary ions, for instance, which amount varies depending on environmental conditions, such as the temperature and the humidity, and the life characteristics of the electron emission element, is stabilized by regulating, based on the current waveform, the voltage applied to the electron emission element. As a result, it is possible to stabilize the ionization capability of the analysis device and stabilize the results of analysis. It is also possible to quantitatively measure the component to be detected with the analysis device according to the present invention.

DESCRIPTION OF THE PREFERRED EMBODIMENTS

Figure 1:
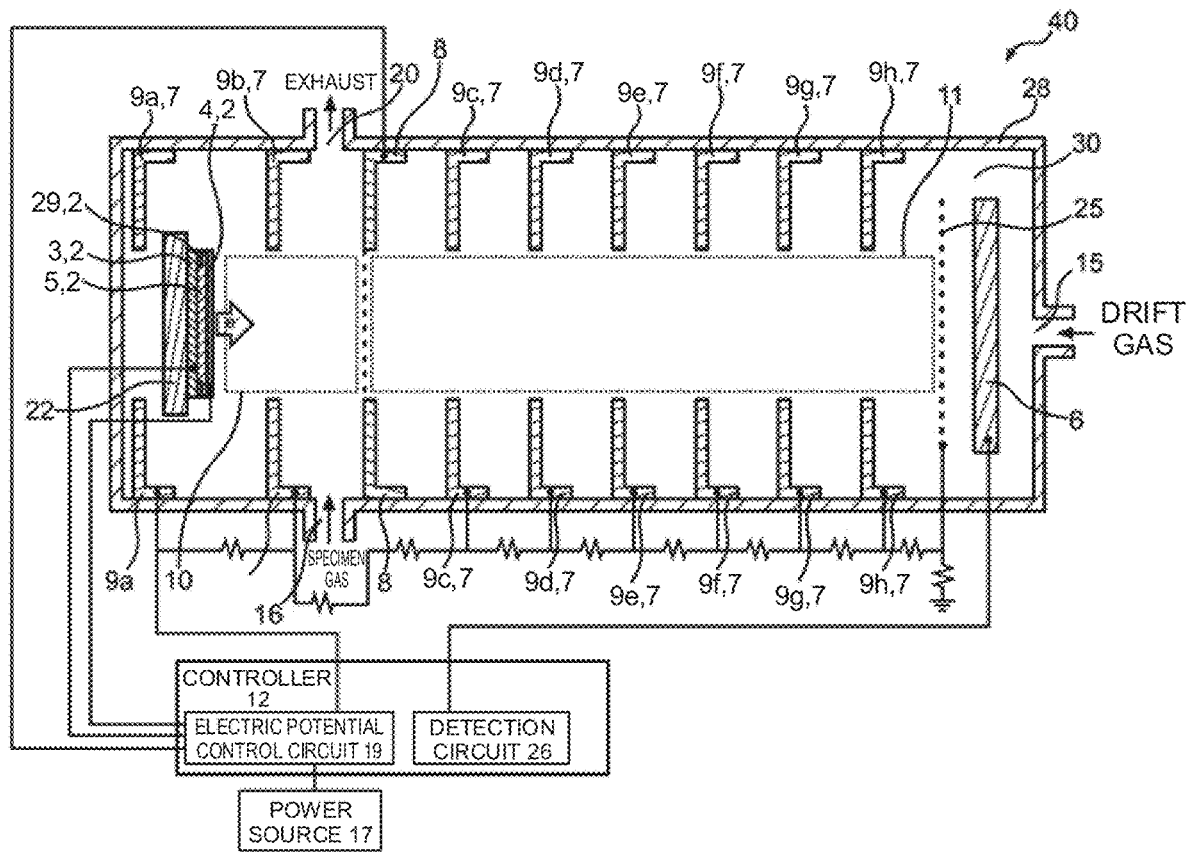
FIG. 1 is a schematic cross-sectional view of an analysis device according to an embodiment of the present invention.

An analysis device according to the present invention includes an electron emission element, a collector, an electric field former, a power source, and a controller. The electron emission element includes a bottom electrode, a surface electrode, and an intermediate layer arranged between the bottom electrode and the surface electrode. The power source and the controller are so provided as to allow application of a voltage between the bottom electrode and the surface electrode. The electric field former is so provided as to form an electric field in an ion movement region where anions directly or indirectly generated by electrons emitted from the electron emission element move toward the collector. The collector and the controller are so provided as to measure a current waveform of an electric current made to flow by arrival of anions at the collector. The controller is so provided as to regulate, based on the current waveform, a voltage applied between the bottom electrode and the surface electrode.

The current waveform can have a peak corresponding to an ion species arriving at the collector.

The controller is preferably so provided as to regulate the voltage applied between the bottom electrode and the surface electrode so that the peak height or the peak area of a peak corresponding to primary ions generated by the ionization of an air component may approach a first target value. Such configuration makes it possible to regulate the output of the electron emission element so that the primary ions may be generated in the ionization region in an amount corresponding to a target value.

The controller is preferably so provided as to regulate the voltage applied between the bottom electrode and the surface electrode so that the total peak area of the current waveform may approach a second target value. By performing such feedback control, it is made possible to cause the analysis device to operate so that the total peak area may be kept constant, and make a quantitative measurement.

The controller is preferably so provided as to change the second target value to regulate the measurement sensitivity or the ionization capability. Such configuration makes it possible to detect anions derived from a component to be detected that is contained in a specimen gas even if the concentration of the component to be detected is low.

It is preferable that the analysis device includes an electrostatic gate electrode. The electrostatic gate electrode is preferably arranged between the ion movement region and an ionization region where anions are directly or indirectly generated by the electrons emitted from the electron emission element. Preferably, the electrostatic gate electrode and the controller are so provided as to allow the control of an electric potential of the electrostatic gate electrode to control the feed of anions generated in the ionization region to the ion movement region.

It is preferable that the analysis device includes a specimen feeder that is so provided as to feed a specimen gas to the ionization region. The controller is preferably so provided as to regulate the voltage applied between the bottom electrode and the surface electrode before starting the feed of the specimen gas to the ionization region. Such configuration makes it possible to perform a calibration process before starting measurement and improve the accuracy of measurement.

The controller is preferably so provided as to regulate the voltage applied between the bottom electrode and the surface electrode after starting the feed of the specimen gas to the ionization region. Such configuration makes it possible to perform feedback control and improve the accuracy of measurement.

It is preferable that the analysis device includes a drift gas feeder and an exhaust port. The drift gas feeder and the exhaust port are preferably provided so that a drift gas may flow in the ion movement region from the collector side toward the electrostatic gate electrode side.

The controller is preferably so provided as to calculate the concentration of the component to be detected, based on the ratio between the peak height or the peak area of the peak corresponding to the primary ions generated by the ionization of an air component and the peak height or the peak area of a peak corresponding to ions generated by the ionization of the component to be detected.

In the following, the present invention is described in more detail with reference to a plurality of embodiments. The accompanying drawings and the description below merely illustrate exemplary configurations, to which the scope of the present invention is in no way limited.

First Embodiment

FIG. 1 is a schematic cross-sectional view of an analysis device according to the present embodiment. FIG. 1 includes a block diagram illustrating an electric configuration of an analysis device 40.

The analysis device 40 according to the present embodiment includes an electron emission element 2, a collector 6, an electric field former 7, a power source 17, and a controller 12. The electron emission element 2 includes a bottom electrode 3, a surface electrode 4, and an intermediate layer 5 arranged between the bottom electrode 3 and the surface electrode 4.

The power source 17 and the controller 12 are so provided as to allow application of a voltage between the bottom electrode 3 and the surface electrode 4. The electric field former 7 is so provided as to form an electric field in an ion movement region 11 where anions directly or indirectly generated by electrons emitted from the electron emission element 2 move toward the collector 6. The collector 6 and the controller 12 are so provided as to measure the current waveform of an electric current made to flow by the arrival of anions at the collector 6. The controller 12 is so provided as to regulate, based on the current waveform, a voltage applied between the bottom electrode 3 and the surface electrode 4.

The analysis device 40 according to the present embodiment is a device that analyzes a specimen by ion mobility spectrometry (IMS). The analysis device 40 may be an ion mobility spectrometer. The analysis device 40 may be a device for analyzing by drift tube IMS or a device for analyzing by field asymmetric waveform IMS (FAIMS). In the present embodiment, description is made on a device for analyzing by drift tube IMS.

The specimen gas to be analyzed by the analysis device 40 may be a gaseous specimen or a vaporized liquid specimen.

The controller 12 is a part that controls the analysis device 40. The controller 12 can include a microcontroller provided with a central processing unit (CPU), a memory, a timer, and an input and output port, for instance. In addition, the controller 12 can include an electric potential control circuit 19 and a detection circuit 26. The controller 12 is so provided as to control the emission of electrons by the electron emission element 2 and the opening and closing of an electrostatic gate electrode 8. The controller 12 is connectable with the power source 17.

The analysis device 40 according to the present embodiment includes an analysis chamber 30 for the analysis of a component to be detected that is contained in a specimen gas, and the analysis chamber 30 has, between the electron emission element 2 and the collector 6, an ionization region 10 for ionizing the component to be detected in the specimen gas to generate anions, and an ion movement region 11 (drift region) for moving and separating the anions. The ionization region 10 and the ion movement region 11 are divided from each other by the electrostatic gate electrode 8. At an end of the ionization region 10 opposite from the electrostatic gate electrode 8, the electron emission element 2 is arranged so that the surface electrode 4 may be located on the ionization region side. At an end of the ion movement region 11 opposite from the electrostatic gate electrode 8, the collector 6 is arranged.

A specimen insufflator 16 is a part that insufflates the specimen gas into the analysis chamber 30. The component to be detected, which is contained in the insufflated specimen gas, is analyzed by ion mobility spectrometry. If a specimen is gaseous, the specimen insufflator 16 can be so provided as to continuously feed the specimen gas to the analysis chamber 30. If a specimen is liquid, the specimen insufflator 16 can include a vaporization chamber and insufflate the specimen gas as obtained by the vaporization of the specimen in the vaporization chamber into the analysis chamber 30.

A drift gas insufflator 15 is a part so provided as to insufflate a drift gas into the analysis chamber 30. The drift gas is a gas that is caused to flow in the ion movement region 11 in a direction opposite to the direction of movement of anions and gives resistance to the anions moving in the ion movement region 11. The drift gas may be air (purified air) obtained by the purification of atmospheric air, or air fed from a compressed air cylinder, or air discharged from the analysis chamber 30 by an exhauster 20 and then purified.

The exhauster 20 is a part so provided as to discharge a gaseous body in the analysis chamber 30. The exhauster 20 is so provided as to discharge the drift gas and the specimen gas from the analysis chamber 30. The exhauster 20 may be so provided as to forcibly discharge the gaseous body in the analysis chamber 30 with an exhaust fan or the like or as to automatically discharge the gaseous body in the analysis chamber 30.

The specimen insufflator 16 and the exhauster 20 are provided so that the specimen gas may flow in the ionization region 10. As a result, it is possible to directly or indirectly ionize a component contained in the specimen gas by electrons emitted from the surface electrode 4 of the electron emission element 2 so as to generate anions in the ionization region 10.

The drift gas insufflator 15 and the exhauster 20 are provided so that the drift gas may flow in the ion movement region 11 from the collector side toward the electrostatic gate electrode side. As an example, the drift gas insufflator 15 can be so provided as to feed the drift gas to the ion movement region 11 from the collector side, and the exhauster 20 can be so provided as to discharge the drift gas through an opening (gas outlet) formed in a housing 28 surrounding the ionization region 10.

The feed flow rate of the drift gas is made higher than the feed flow rate of the specimen gas. Consequently, the molecules, which have not been ionized in the ionization region 10, do not flow into the ion movement region 11 and are discharged through the exhauster 20. The molecules, which have been ionized in the ionization region 10, are only induced by an electric field and flow into the ion movement region 11 against the flow of the drift gas, then move toward the collector 6.

When the specimen gas is analyzed by the analysis device 40, the feed of the drift gas into the analysis chamber 30 by the drift gas insufflator 15 is started and, after a lapse of a specified time, the feed of the specimen gas to the ionization region 10 by the specimen insufflator 16 is started. As a result, it is possible to suppress the adhesion of a specimen gas component to an inner wall face of the analysis chamber 30 and an electric field forming electrode 9, and improve the accuracy of analysis of the analysis device 40. In addition, it is possible to perform a calibration process before starting the feed of the specimen gas to the ionization region 10 after starting the feed of the drift gas into the analysis chamber 30. The calibration process will be described later.

The electron emission element 2 is so provided as to emit electrons from the surface electrode 4 and is an element for directly or indirectly ionizing a component to be detected that is contained in a specimen gas by the emitted electrons so as to generate anions.

The electron emission element 2 includes the bottom electrode 3, the surface electrode 4, and the intermediate layer 5 arranged between the bottom electrode 3 and the surface electrode 4.

The surface electrode 4 is an electrode located at the surface of the electron emission element 2. The surface electrode 4 preferably has a thickness of 10 to 100 nm. The material for the surface electrode 4 is gold or platinum, for instance. The surface electrode 4 may be composed of a plurality of metal layers.

Even if having a thickness of 40 nm or more, the surface electrode 4 may have a plurality of openings, gaps, or thinned portions with a thickness of 10 nm or less. The electrons, which have flowed through the intermediate layer 5, are able to pass through or permeate such openings, gaps or thinned portions, so that the emission of electrons from the surface electrode 4 is possible. The openings, gaps or thinned portions as above may be formed by applying a voltage between the bottom electrode 3 and the surface electrode 4.

The bottom electrode 3 is an electrode facing the surface electrode 4 through the intermediate layer 5. The bottom electrode 3 may be a metal plate, or a metal layer or conductor layer that is formed on an insulating substrate or film. If the bottom electrode 3 consists of a metal plate, the metal plate may be a substrate for the electron emission element 2. Examples of the material for the bottom electrode 3 include aluminum, a stainless steel, and nickel. The thickness of the bottom electrode 3 is 200 μm or more but not more than 1 mm, for instance.

The intermediate layer 5 is the layer, through which electrons flow by the effect of an electric field formed by applying a voltage between the surface electrode 4 and the bottom electrode 3. The intermediate layer 5 can be semiconductive. The intermediate layer 5 can contain at least one of an insulating resin, insulating fine particles, and a metal oxide. The intermediate layer 5 preferably contains conductive fine particles. The thickness of the intermediate layer 5 may be 0.5 to 1.8 μm.

The electron emission element 2 may include an insulating layer 29 between the surface electrode 4 and the bottom electrode 3. The insulating layer 29 can have an opening. The opening of the insulating layer 29 is so provided as to define an electron emission region of the surface electrode 4. Since no electrons are able to flow through the insulating layer 29, electrons flow through a portion of the intermediate layer 5 corresponding to the opening of the insulating layer 29 and are emitted from the surface electrode 4. Consequently, the electron emission region to be formed in the surface electrode 4 is defined by providing the insulating layer 29, which has an opening. The electron emission region can be made five millimeters square, for instance, and freely designed according to the size of an opening of the electric field forming electrode 9 or the size of the collector 6.

The surface electrode 4 and the bottom electrode 3 are each electrically connectable with the controller 12. If the electric potential control circuit 19 of the controller 12 is used to make the electric potential of the bottom electrode 3 essentially equal to the electric potential of the surface electrode 4, no electric currents flow through the intermediate layer 5 and electrons are not emitted from the electron emission element 2.

If the electric potential control circuit 19 is used to apply a voltage between the bottom electrode 3 and the surface electrode 4 so that the electric potential of the bottom electrode 3 may be lower than the electric potential of the surface electrode 4, an electric current flows through the intermediate layer 5 and the electrons, which have flowed through the intermediate layer 5, pass through the surface electrode 4 and are emitted toward the ionization region 10. The voltage applied between the bottom electrode 3 and the surface electrode 4 in order to cause the electron emission element 2 to emit electrons may be 5 to 40 V.

If electrons are emitted from the electron emission element 2 to the ionization region 10 before starting the feed of the specimen gas to the ionization region 10 after starting the feed of the drift gas into the analysis chamber 30, the electrons promptly collide with an air component to form primary ions (anions). The primary ions are, for instance, oxygen ions obtained by the ionization of oxygen gas in the air. At this time, the primary ions are present in the ionization region 10 in an amount in proportion to the electron emission amount of the electron emission element 2. The amount of the primary ions in the ionization region 10, however, varies depending on environmental conditions, such as the temperature and the humidity, and the life characteristics of the electron emission element 2.

Such amount of the primary ions is regulated by regulating the voltage applied between the surface electrode 4 and the bottom electrode 3 (that is to say, by regulating the electron emission amount of the electron emission element 2).

If electrons are emitted from the electron emission element 2 to the ionization region 10 after starting the feed of the drift gas into the analysis chamber 30 and the feed of the specimen gas to the ionization region 10, the electrons promptly collide with an air component to form primary ions (anions). In the ionization region 10, the primary ions deliver an electric charge to the component to be detected, which is contained in the specimen gas, so as to generate anions of the component to be detected in the specimen gas (ion molecule reaction). In other words, it is possible to use the electron emission element 2 to indirectly generate the anions of the component to be detected in the specimen gas in the ionization region 10. At this time, the anions generated from the component to be detected in the specimen gas and the primary ions are present in the ionization region 10.

The electric field former 7 is a part for forming a potential gradient in a region between the electron emission element 2 and the collector 6. The electric field former 7 is so provided as to form a potential gradient allowing anions to move from the electron emission element side to the collector side. The electric field former 7 may be composed of a plurality of electric field forming electrodes 9a through 9h (hereinafter also referred to as electric field forming electrodes 9). The electric field forming electrodes 9 are not limited in shape as long as a potential gradient is formed in a region between the electron emission element 2 and the collector 6, and may each be a ring electrode or an arch electrode. The electric field forming electrodes 9 line up so that the ionization region 10 and the ion movement region 11 (drift region) may be formed within a ring or inside an arch. The electric field forming electrodes 9, which constitute the electric field former 7, are electrically connected with the electric potential control circuit 19 of the controller 12.

Any two adjacent electric field forming electrodes 9 included in the electric field former 7 are electrically connectable to each other with a resistor being placed between the two electric field forming electrodes 9. Consequently, it is possible to generate a potential difference between any two adjacent electric field forming electrodes 9 and form a potential gradient in a region between the electron emission element 2 and the collector 6 by generating potential differences between the electric field forming electrodes 9.

In the analysis device 40 illustrated in FIG. 1, the electric field former 7 is composed of the electric field forming electrodes 9a through 9h and any two adjacent electric field forming electrodes 9 are electrically connected to each other with a resistor being placed between the two electric field forming electrodes 9. Among a plurality of electric field forming electrodes 9, the electrode 9h, which is nearest to the collector 6, is electrically connected to a grid electrode 25 with a resistor being placed between the electrode 9h and the grid electrode 25. The grid electrode 25 is connected to the ground with a resistor being placed between the grid electrode 25 and the ground. The electric potential of the electrode 9a, which is farthest from the collector 6, is controllable by the electric potential control circuit 19. As an example, the electric potential control circuit 19 can apply a voltage so that the electric potential of the electrode 9a may be −1080 V. The grid electrode 25, as being connected to the ground with a resistor being placed between the grid electrode 25 and the ground, has an electric potential approximate to 0 V. Since any two adjacent electric field forming electrodes 9 are electrically connected to each other with a resistor being placed between the two electric field forming electrodes 9, a plurality of electric field forming electrodes 9 that line up increase in electric potential in a stepped manner as coming nearer to the collector 6. It is thus possible to form the potential gradient, in which the electric potential is gradually increased as coming nearer to the collector 6, in a region (consisting of the ionization region 10 and the ion movement region 11) between the electron emission element 2 and the collector 6. Such potential gradient, however, is changed by the electric potential of the electrostatic gate electrode 8 in the vicinity of the electrostatic gate electrode 8.

The electric potential control circuit 19 is capable of controlling the electric potential of the electron emission element 2 taking account of the potential gradient formed by the electric field forming electrodes 9. The electron emission element 2 can serve as part of the electric field former 7, and the electric field forming electrodes 9 can cooperate with the electron emission element 2 to form a potential gradient.

The electrostatic gate electrode 8 is an electrode that divides the ionization region 10 and the ion movement region 11 from each other and uses the electrostatic interaction between anions generated in the ionization region 10 and the electrostatic gate electrode 8 to control the injection of the anions into the ion movement region 11.

The electrostatic gate electrode 8 is a grid-formed electrode, for instance. The electrostatic gate electrode 8 can be so arranged as to line up along with the electric field forming electrodes 9 constituting the electric field former 7. The electrostatic gate electrode 8 is electrically connectable with the electric potential control circuit 19 of the controller 12. The electrostatic gate electrode 8 is so provided as to allow the change of a potential gradient formed by the electric field former 7.

Figure 2:
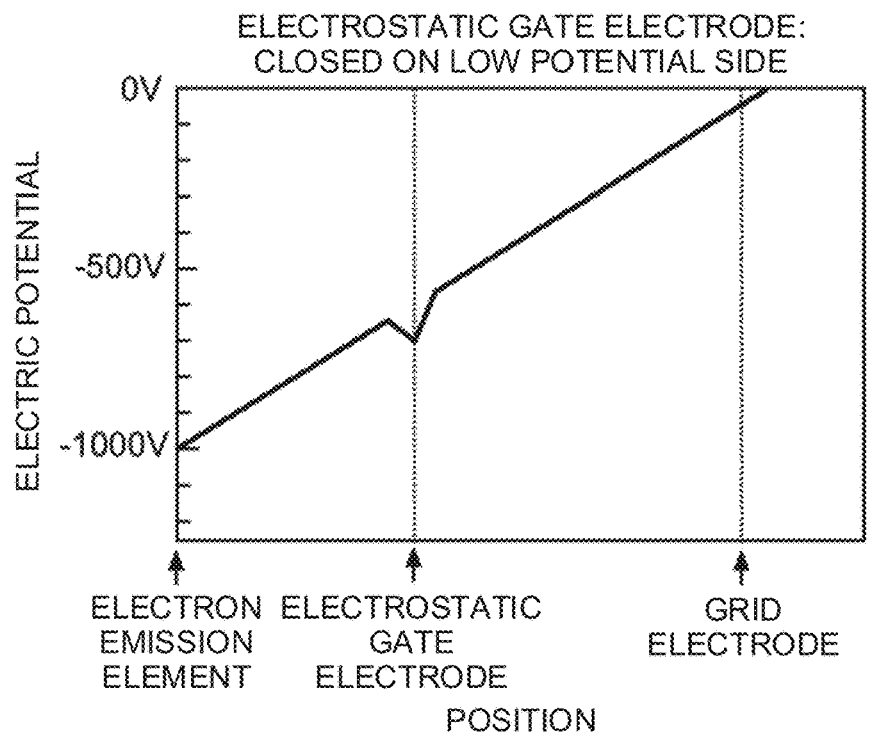
FIG. 2 is a graph illustrating a potential gradient from an electron emission element to a grid electrode.

The electric potential control circuit 19 of the controller 12 controls the electric potential of the electrostatic gate electrode 8 so that it may be possible to change the electrostatic gate electrode 8 from an opened state to a closed state and vice versa by changing the electric potential of the electrostatic gate electrode 8. If the electric potential of the electrostatic gate electrode 8 is lower than the electric potential of an adjacent electric field forming electrode 9b on the electron emission element side, for instance, the potential gradient between the electron emission element 2 and the grid electrode 25 is as illustrated in the graph of FIG. 2. In that case, the anions in the ionization region 10 are unable to approach the electrostatic gate electrode 8 due to the electrostatic interaction (a force in a direction of rebound from the electrostatic gate electrode 8 acting on the anions) and, accordingly, unable to pass through the electrostatic gate electrode 8. Consequently, the electrostatic gate electrode 8 is made closed (that is to say, closed on the low potential side).

Figure 3:
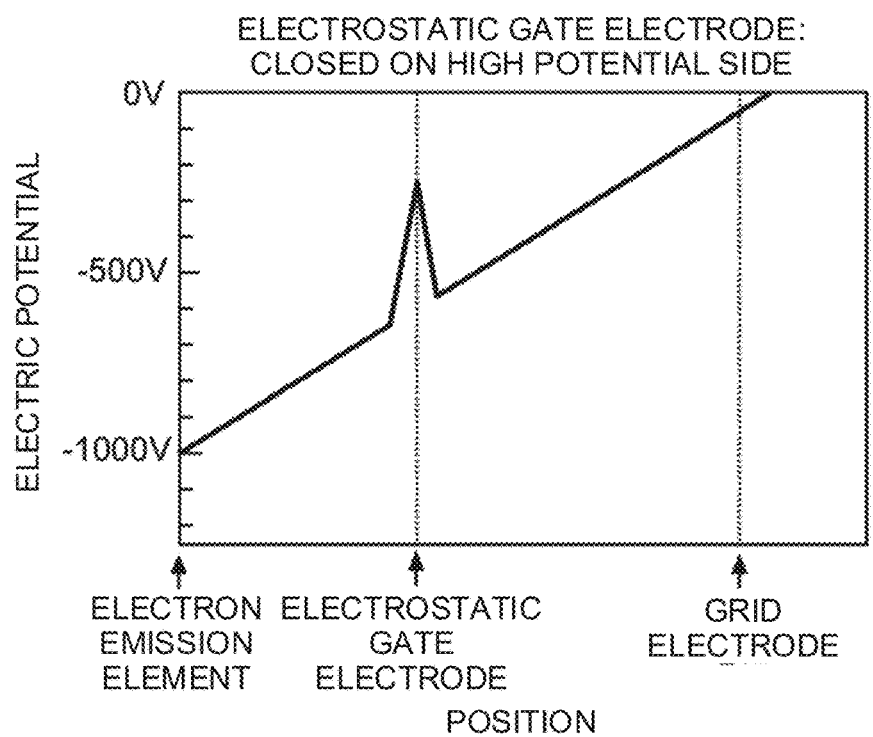
FIG. 3 is a graph illustrating a potential gradient from the electron emission element to the grid electrode.

If the electric potential of the electrostatic gate electrode 8 is higher than the electric potential of an adjacent electric field forming electrode 9c on the collector side, the potential gradient between the electron emission element 2 and the grid electrode 25 is as illustrated in the graph of FIG. 3. In that case, the anions in the ionization region 10 move as if attracted to the electrostatic gate electrode 8 and the electric charge of the anions is transferred to the electrostatic gate electrode 8, so that the anions are neutralized. Consequently, the anions are unable to pass through the electrostatic gate electrode 8 and the electrostatic gate electrode 8 is made closed (that is to say, closed on the high potential side).

Figure 4:
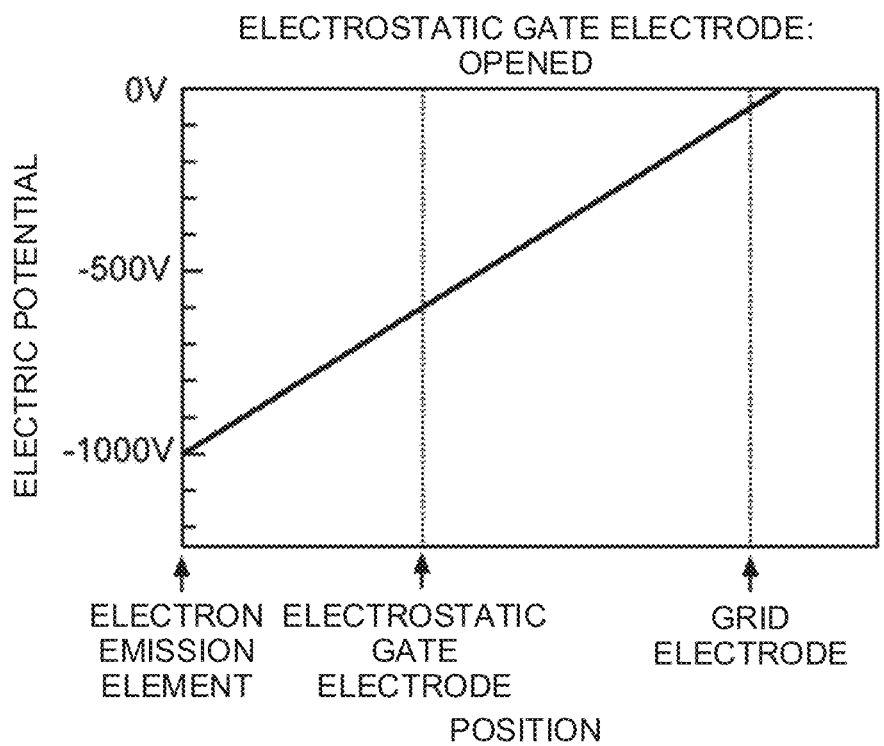
FIG. 4 is a graph illustrating a potential gradient from the electron emission element to the grid electrode.

If the electric potential of the electrostatic gate electrode 8 is higher than the electric potential of the adjacent electric field forming electrode 9b on the electron emission element side and lower than the electric potential of the adjacent electric field forming electrode 9c on the collector side, the potential gradient between the electron emission element 2 and the grid electrode 25 is such that the electric potential is gradually increased as coming farther from the electron emission element 2 and nearer to the grid electrode 25, as illustrated in the graph of FIG. 4, for instance. In that case, the anions in the ionization region 10 are able to pass through the electrostatic gate electrode 8 and the electrostatic gate electrode 8 is made opened.

If the electric potential control circuit 19 is used to instantaneously change the voltage applied to the electrostatic gate electrode 8 so that an electric potential exceeding a potential range making the electrostatic gate electrode 8 opened may be changed to an electric potential falling below the potential range, the electrostatic gate electrode 8 is instantaneously changed from a closed state (state of being closed on the high potential side) to an opened state, then to a closed state (state of being closed on the low potential side).

If the electric potential control circuit 19 is used to instantaneously change the voltage applied to the electrostatic gate electrode 8 so that an electric potential falling below the potential range making the electrostatic gate electrode 8 opened may be changed to an electric potential exceeding the potential range, the electrostatic gate electrode 8 is instantaneously changed from a closed state (state of being closed on the low potential side) to an opened state, then to a closed state (state of being closed on the high potential side).

It is thus possible to make the electrostatic gate electrode 8 opened only for an extremely brief time and inject the anions in the ionization region 10 into the ion movement region 11 only for such brief time by using the electric potential control circuit 19 to change the voltage applied to the electrostatic gate electrode 8 as described above. Consequently, the anions in the ionization region 10 are injected into the ion movement region 11 in the form of a single pulse.

The anions as injected into the ion movement region 11 move in the ion movement region 11 toward the collector 6 according to the potential gradient, which is formed by the application of a voltage to the electric field former 7 and the grid electrode 25 by the electric potential control circuit 19, and arrive at the collector 6. During such movement, the anions move against the flow of the drift gas. The flow of the drift gas gives resistance to the anions, which move from the electrostatic gate electrode 8 toward the collector 6. The magnitude of the resistance (namely, the ion mobility) depends on the ion species. In general, the mobility is reciprocally proportional to the collision cross section of ions (size of ions), so that the ions need a longer time until the arrival at the collector 6 as the collision cross section of the ions is larger. Therefore, the time from the injection into the ion movement region 11 by the electrostatic gate electrode 8 to the arrival at the collector 6 (time of arrival, peak position) depends on the ion species of the anions. It is thus possible to specify the anions (namely, the component to be detected as contained in the specimen gas) based on the time of arrival (peak position). It is also possible to separate anions of two or more components to be detected that are contained in the specimen gas from one another in the ion movement region 11.

The collector 6 is a metallic member that collects the electric charge of the anions. The collector 6 is electrically connectable with the detection circuit 26 of the controller 12. The detection circuit 26 is so provided as to make a time-series measurement of a recovery current generated by the delivery of the electric charge from the anions to the collector 6. As a result, it is possible to measure the current waveform of the recovery current.

The detection circuit 26 may be provided so that the measurement range (detection sensitivity) may be changeable according to the magnitude of the recovery current.

Changing the measurement range (detection sensitivity) between the case where the component to be detected in the specimen gas is of a high concentration and the case where the component to be detected in the specimen gas is of a low concentration makes it possible to subject the component to be detected to an appropriate qualitative or quantitative analysis.

Two or more species of anions that are injected into the ion movement region 11 in the form of a single pulse using the electrostatic gate electrode 8 are separated from one another based on the species while moving in the ion movement region 11, and different species of anions arrive at the collector 6 at different points of time. In consequence, the current waveform of the recovery current has peaks corresponding to times of arrival of different species of anions, which makes it possible to calculate the mobility from the peak position (time of arrival) so as to distinguish anionic components from one another. Since the peak height or the peak area of the current waveform of the recovery current corresponds to the amount of electric charge delivered from anions varying in species to the collector 6, it is possible to subject the component to be detected to a quantitative analysis based on the peak height or the peak area.

If anions are to be injected into the ion movement region 11 two or more times, the current waveform of the recovery current may be measured each time anions are injected, and current waveforms corresponding to the two or more injections of anions, respectively, may be integrated and averaged so as to determine the average current waveform.

In the current waveform of the recovery current, a peak corresponding to one and the same species of anions represents a distribution approximate to one normal distribution, and the peak position of such peak (namely, the time of arrival) has a value inherent to the species of the anions. It is therefore possible to distinguish the components to be detected, which are contained in the specimen gas, from one another based on the peak position (time of arrival).

The peak position (time of arrival) inherent to anions can be obtained from the current waveform of the recovery current, which is obtained by analyzing a standard specimen for the anions by the analysis device 40.

Figure 5:
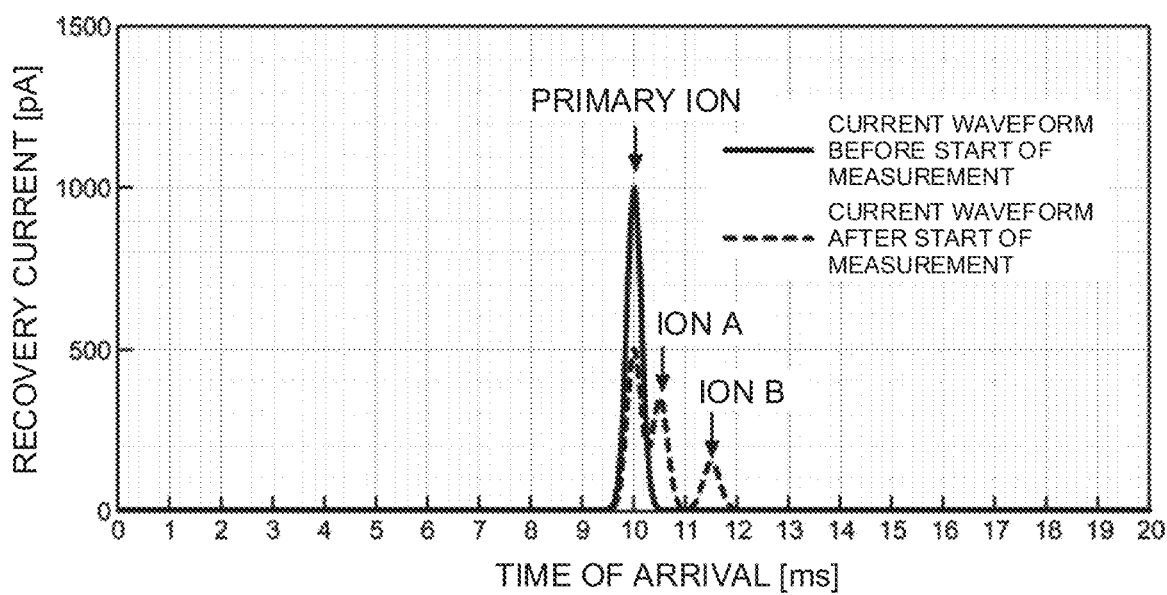
FIG. 5 is a graph illustrating current waveforms of a recovery current.

FIG. 5 illustrates an example of current waveforms of the recovery current that are measured using the detection circuit 26. A solid line waveform in FIG. 5 is the current waveform of the recovery current, which is made to flow by the arrival of primary ions at the collector 6, with the primary ions being generated by electrons emitted from the electron emission element 2 before starting the feed of the specimen gas to the ionization region 10 after starting the feed of the drift gas into the analysis chamber 30, and injected into the ion movement region 11 (this current waveform being hereinafter referred to as "current waveform before the start of measurement"). The time of arrival of ions is plotted on the x-axis, with the value at the moment of opening of the electrostatic gate electrode 8 being set to zero, and the recovery current, which occurs as a result of the recovery of the electric charge of anions having arrived at the collector 6, is plotted on the y-axis.

In the current waveform before the start of measurement, the peak corresponding to the primary ions exclusively appears because the anions, which are present in the ionization region 10, are chiefly the primary ions.

A broken line waveform in FIG. 5 is the current waveform of the recovery current, which is made to flow by the arrival of primary ions and anions at the collector 6. The primary ions are generated by electrons emitted from the electron emission element 2, while the anions are obtained by ionizing a component to be detected that is contained in the specimen gas, after starting the feed of the drift gas into the analysis chamber 30 and the feed of the specimen gas to the ionization region 10, and both the primary ions and the anions are injected into the ion movement region 11 (the above current waveform being hereinafter referred to as "current waveform after the start of measurement").

In the current waveform after the start of measurement, a peak corresponding to the anions as above appears. In the example illustrated in FIG. 5, ions A and ions B are generated from the component to be detected in the specimen gas.

When the feed of the specimen gas to the ionization region 10 is started, a component to be detected in the specimen gas is ionized by the delivery of the electric charge from the primary ions to the component to be detected. As a result, in the current waveform after the start of measurement illustrated in FIG. 5, the peak height for the primary ions is reduced as compared with the current waveform before the start of measurement, and a peak of anions generated from the component to be detected appears. In addition, some component to be detected in the specimen gas may generate multimer ions, such as dimer or trimer ions, apart from monomer ions, and the time of arrival varies with the type of generated ions. For this reason, a plurality of peaks in the current waveform after the start of measurement may correspond to a single component to be detected in the specimen gas. In FIG. 5, for instance, the peak of the ions A is a peak of monomer ions and the peak of the ions B is a peak of dimer ions.

Figure 6:
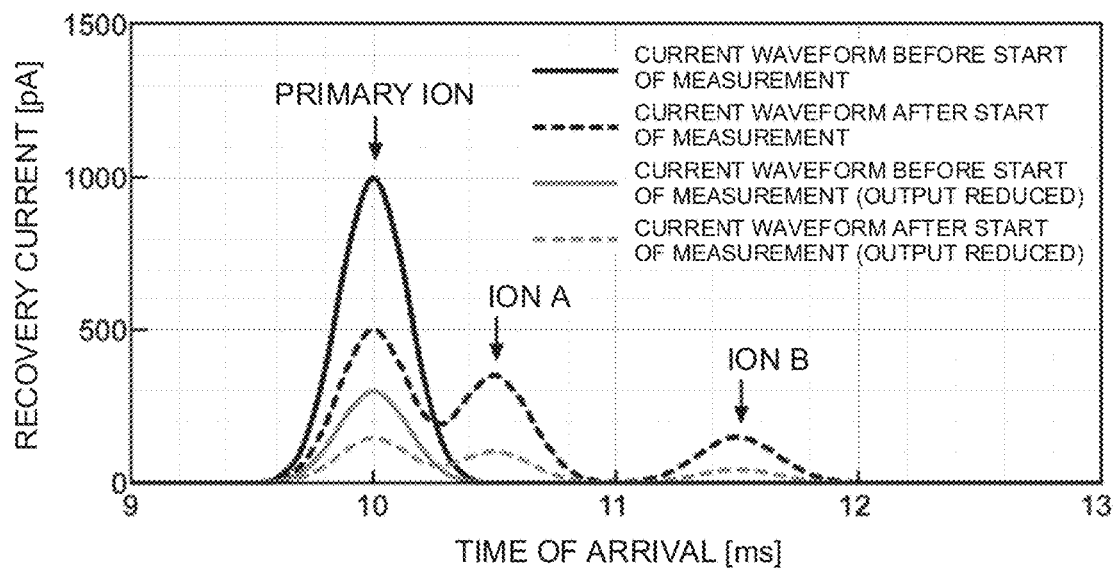
FIG. 6 is a graph illustrating current waveforms of the recovery current.

FIG. 6 illustrates waveforms measured if the generation amount of primary ions in the ionization region 10 is reduced due to the environmental conditions or the change over time. A black solid line waveform is a current waveform before the start of measurement in the state, where the generation amount of primary ions is not reduced, and a black broken line waveform is a current waveform after the start of measurement in the state, where the generation amount of primary ions is not reduced. A gray solid line waveform is a current waveform before the start of measurement in the state, where the generation amount of primary ions is reduced, and a gray broken line waveform is a current waveform after the start of measurement in the state, where the generation amount of primary ions is reduced.

Attendant on the reduction of the generation amount of primary ions, the generation amount of anions generated from the component to be detected is also reduced. If the peak height of a peak of detected ions varies as illustrated, no hindrance is caused to the measurement of the time of arrival of ions (qualitative measurement) as long as the peak position is distinguishable, while a quantitative assessment, such as the estimation of the concentration of the component to be detected, cannot be carried out.

Figure 7:
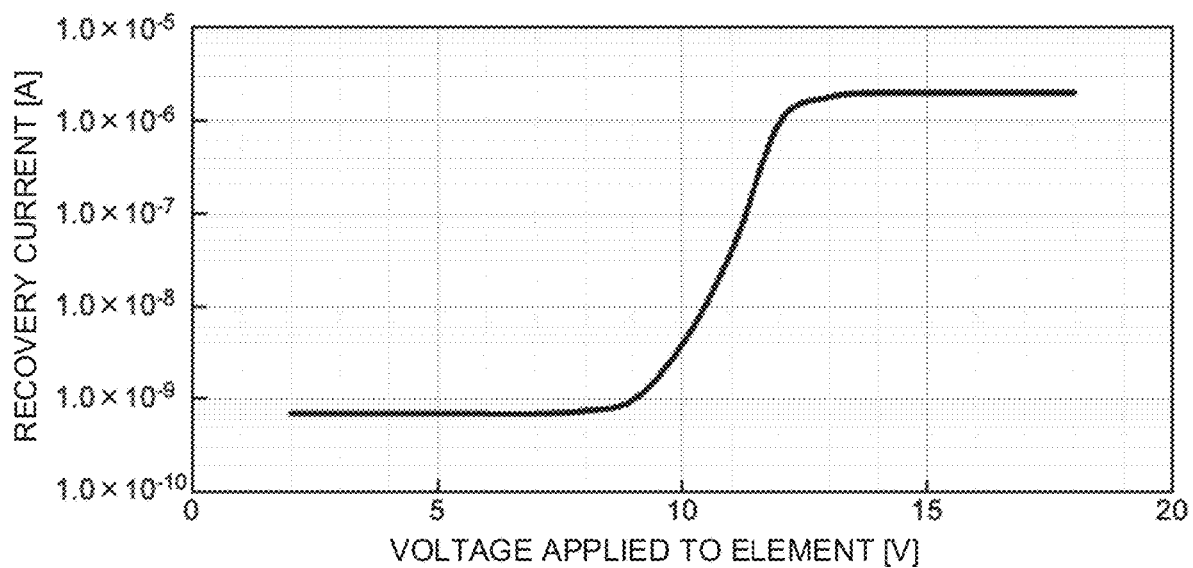
FIG. 7 is a graph illustrating the recovery current as a function of a voltage applied between a surface electrode and a bottom electrode of the electron emission element.

FIG. 7 illustrates the output characteristics (electron emission characteristics) of the electron emission element 2 with respect to the voltage applied to the electron emission element 2 (voltage applied between the surface electrode 4 and the bottom electrode 3), and illustrates the recovery current amount when a collector electrode is arranged nearest to the electron emission element 2. Plotting is performed with the y-axis of the graph being defined as a logarithmic axis. It is seen from the illustrated example that the output is changed to a degree of 10 cubed or more when the applied voltage is changed in an amount of several volts. Such output characteristics vary depending on the fabrication recipe of the electron emission element 2, the environment including the humidity, the change over time, and the like, while the fact that the output tends to be significantly changed by a change in applied voltage of several volts is shared among various circumstances.

Consequently, it is possible to significantly change the electron emission amount of the electron emission element 2 and regulate the amount of primary ions fed to the ionization region 10 by regulating the voltage applied between the surface electrode 4 and the bottom electrode 3.

For the detection of a malodorous gas, for instance, a measurement range of 10 to the fifth or so is desired even if the detection is only directed to a single substance, and a measurement range of 10 to the seventh through the eighth is required in order to cope with multiple substances. The measurement of a component to be detected with such a broad measurement range is made possible by regulating the voltage applied to the electron emission element 2 so as to change the analysis sensitivity.

Such a dynamic change in measurement range as above is not possible in the conventional ionization method.

Figure 8:
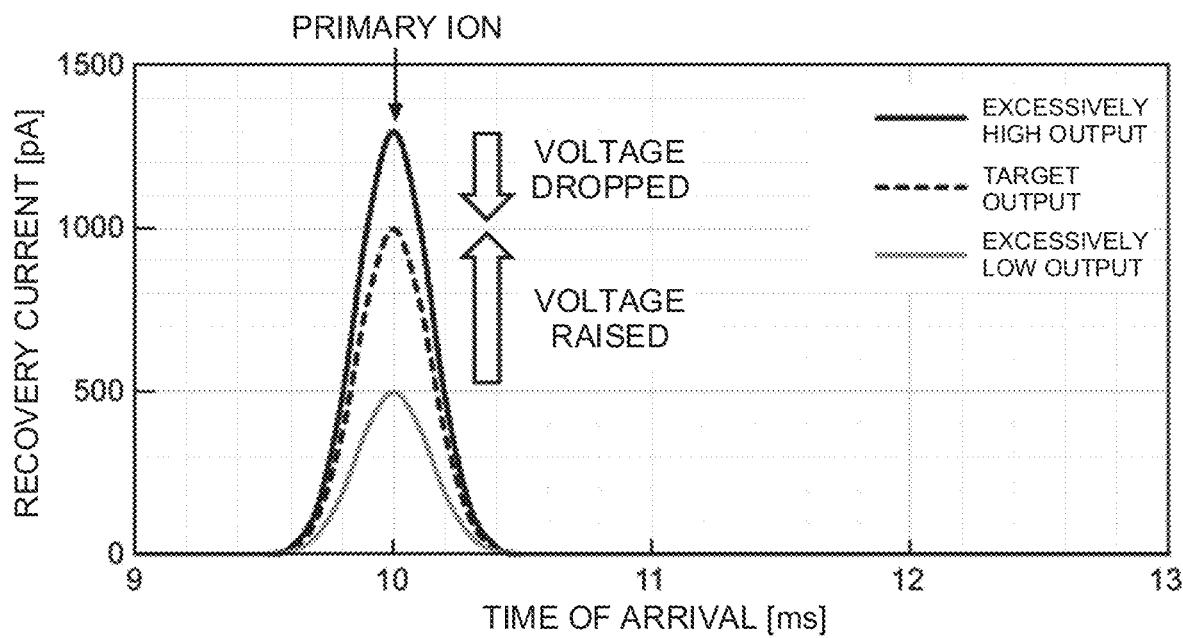
FIG. 8 is a graph illustrating current waveforms of the recovery current.

The controller 12 is so provided as to regulate, based on the current waveform before the start of measurement, the voltage applied between the bottom electrode 3 and the surface electrode 4 so that the peak height or the peak area of the peak corresponding to the primary ions generated by the ionization of an air component may approach a target value. In other words, the controller 12 performs a calibration process before the start of measurement. Specifically, primary ions generated by electrons emitted from the electron emission element 2 before starting the feed of the specimen gas to the ionization region 10 after starting the feed of the drift gas into the analysis chamber 30 are injected into the ion movement region 11, and the current waveform (current waveform before the start of measurement) of the recovery current, which is made to flow by the arrival of the primary ions at the collector 6, is measured. If the peak height or the peak area for the primary ions in the above current waveform exceeds a specified target value, the voltage applied to the electron emission element 2 is dropped, then the primary ions are injected into the ion movement region 11 again so as to remeasure the current waveform of the recovery current. For instance, if the target value of the peak height for the primary ions is set to 1000 pA and the current waveform as illustrated in FIG. 8 with a black solid line is measured, the voltage applied to the electron emission element 2 is dropped so as to remeasure the current waveform. If the current waveform as illustrated in FIG. 8 with a gray solid line is measured, the voltage applied to the electron emission element 2 is raised so as to remeasure the current waveform.

The latitude to regulate the voltage applied to the electron emission element 2 can be determined based on the difference between the peak height or the peak area for the primary ions and the target value.

A series of such operations are repeated until the difference between the peak height or the peak area for the primary ions and the target value falls within an error range (feedback control). The error range may be set to be ±5%. As a result, it is possible to regulate the output of the electron emission element 2 so that the primary ions may be generated in the ionization region 10 in an amount corresponding to a specified target value.

Such regulation of the output of the electron emission element 2 makes it possible to prevent the generation amount of the primary ions from varying depending on the environmental conditions, such as the temperature and the humidity, or the life characteristics of the electron emission element 2. In other words, it is possible to make the total charge amount of ions present in the ionization region 10 uniform among respective measurements.

The controller 12 can be so provided as to set the target value as above according to the concentration of the component to be detected contained in the specimen gas.

After the regulation of the output of the electron emission element 2, the measurement by the analysis device 40 is started. Specifically, the specimen insufflator 16 is used to start the feed of the specimen gas to the ionization region 10. The component to be detected, which is contained in the specimen gas, receives the electric charge from the primary ions and is converted into anions (by an ion molecule reaction) in the ionization region 10. Then, the electrostatic gate electrode 8 is used to inject the anions in the ionization region 10 into the ion movement region 11, and the current waveform of the recovery current, which is made to flow by the arrival of the anions at the collector 6, is measured. In this current waveform, a peak of the anions, which are generated from the component to be detected in the specimen gas, and a peak of the primary ions appear. From the peak position (time of arrival) of each peak, anions corresponding to the relevant peak are specified (qualitative analysis).

In addition, comparison of the peak area of the peak of the anions generated from the component to be detected with a calibration curve prepared in advance makes it possible to calculate the concentration of the component to be detected in the specimen gas (quantitative analysis).

The calibration curve is produced as follows: Specimens containing the component to be detected at different known concentrations are prepared as standard specimens. The specimens are measured by the analysis device 40 and the peak area of the peak of the anions generated from the component to be detected is calculated for each specimen. Thus, a calibration curve representing the relationship between the concentration of the component to be detected and the peak area is produced. It is thus possible to calculate the concentration of the component to be detected in the specimen gas by applying the peak area as calculated during the measurement to the calibration curve.

The calibration process as described above is also performed before starting the measurement of standard specimens for the production of a calibration curve, so as to regulate the voltage applied to the electron emission element 2. At this time, the target value of the peak height or the peak area for the primary ions is made equal to the target value, which is used in the calibration before the measurement of the specimen gas. Consequently, the total charge amount of anions present in the ionization region 10 is essentially made the same between the measurement for the production of a calibration curve and the measurement of the specimen gas, and the concentration of the component to be detected is calculated with accuracy.

The target value to be set for the peak height or the peak area for the primary ions may be two or more in number, and calibration curves corresponding to two or more target values, respectively, may be produced. In that case, the target value can be selected according to the concentration of the component to be detected in the specimen gas.

Second Embodiment

In the first embodiment, in which a peak waveform derived from the primary ions in the state, where the specimen gas is not introduced into the ionization region 10, is measured and the calibration process is performed before the component to be detected in the specimen gas is measured, calibration needs to be made for each measurement, which makes operations complicated and a continuous measurement difficult. In order to solve such problem, in a second embodiment, feedback control is so performed as to make the total peak area of the current waveform of the recovery current constant in a continuous measurement of the specimen gas. Making the total peak area of the current waveform of the recovery current constant is equivalent to making the total charge amount of anions having arrived at the collector 6 constant.

In the second embodiment, the controller 12 is so provided as to regulate the voltage applied between the bottom electrode 3 and the surface electrode 4 so that the total peak area of the current waveform before the start of measurement or the current waveform after the start of measurement may approach a target value.

First of all, the calibration process as described in the first embodiment is performed so as to regulate the voltage applied to the electron emission element 2. The controller 12 calculates the area of the peak of the primary ions in the current waveform before the start of measurement after the regulation, and sets the calculated peak area as a target value.

Figure 9:
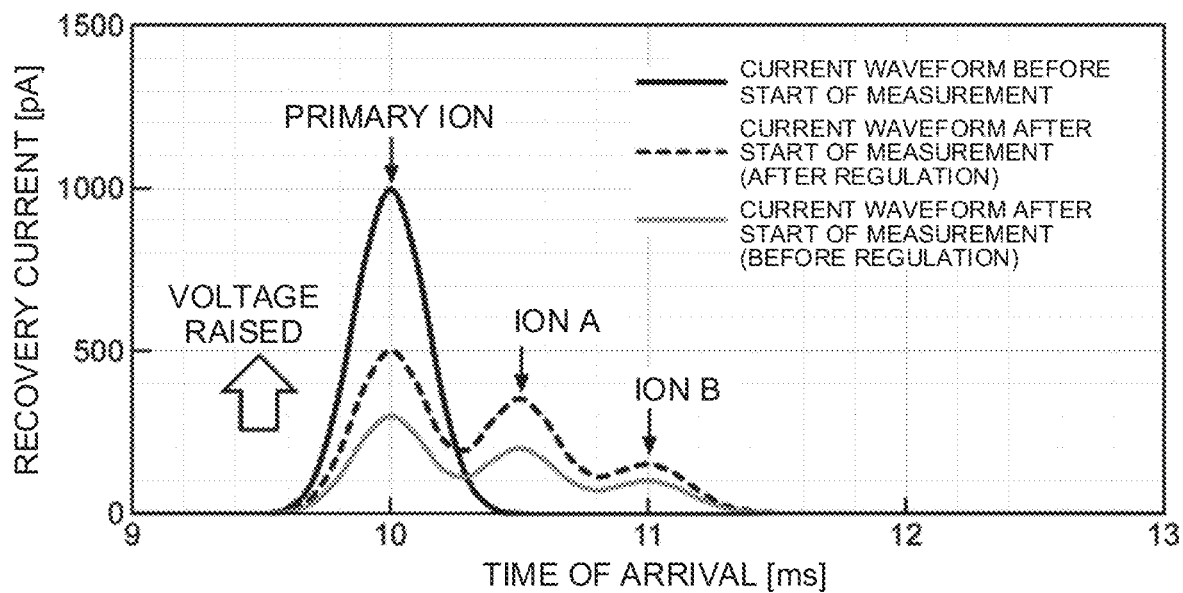
FIG. 9 is a graph illustrating current waveforms of the recovery current.

As an example, if the target value of the peak height in the calibration process is set to 1000 pA, the current waveform before the start of measurement after the regulation of the voltage applied to the electron emission element 2 is represented by a black solid line waveform illustrated in FIG. 9. The peak area of the peak of the primary ions in the current waveform is found to be 340. Such value of the peak area is set as a target value. The target value of the total peak area may be a peak area set in advance or the total peak area of the first current waveform after the start of measurement.

Following the calibration process, the measurement by the analysis device 40 is started. Specifically, the specimen insufflator 16 is used to start the feed of the specimen gas to the ionization region 10. The component to be detected, which is contained in the specimen gas, receives the electric charge from the primary ions and is converted into anions (by an ion molecule reaction) in the ionization region 10. Then, the electrostatic gate electrode 8 is used to inject the anions in the ionization region 10 into the ion movement region 11, and the current waveform of the recovery current, which is made to flow by the arrival of the anions at the collector 6, is measured. In this current waveform, a peak of the anions, which are generated from the component to be detected in the specimen gas, and a peak of the primary ions appear.

The controller 12 calculates the total area of such peaks, and compares the calculated total peak area with the target value. If the total peak area is of a value smaller than the target value, the voltage applied to the electron emission element 2 is raised so as to allow the total peak area of the current waveform next measured to approach the target value. If the total peak area is of a value larger than the target value, the voltage applied to the electron emission element 2 is dropped so as to allow the total peak area of the current waveform next measured to approach the target value. The latitude to regulate the voltage applied to the electron emission element 2 can be determined based on the difference between the calculated total peak area and the target value.

The feedback control as above is performed for each current waveform measured. By continually performing the feedback control as above, it is made possible to make a quantitative measurement because the operation is carried out such that the total peak area is kept constant without considerably deviating from the target value after once reaching the target value.

It is assumed that a current waveform illustrated in FIG. 9 with a gray solid line is measured when the target value of the total peak area is set to 340, for instance. The current waveform has the peaks of the ions A and the ions B generated from the component to be detected, and the peak of the primary ions. The total peak area of the peaks is found to be 200. Such value of the total peak area is smaller than the target value, so that the voltage applied to the electron emission element 2 is raised so as to increase the total charge amount in the ionization region 10. As a result, the total peak area of the current waveform next measured is increased. For instance, a current waveform illustrated in FIG. 9 with a black broken line is measured. The total peak area of this current waveform is found to be 340.

Figure 10:
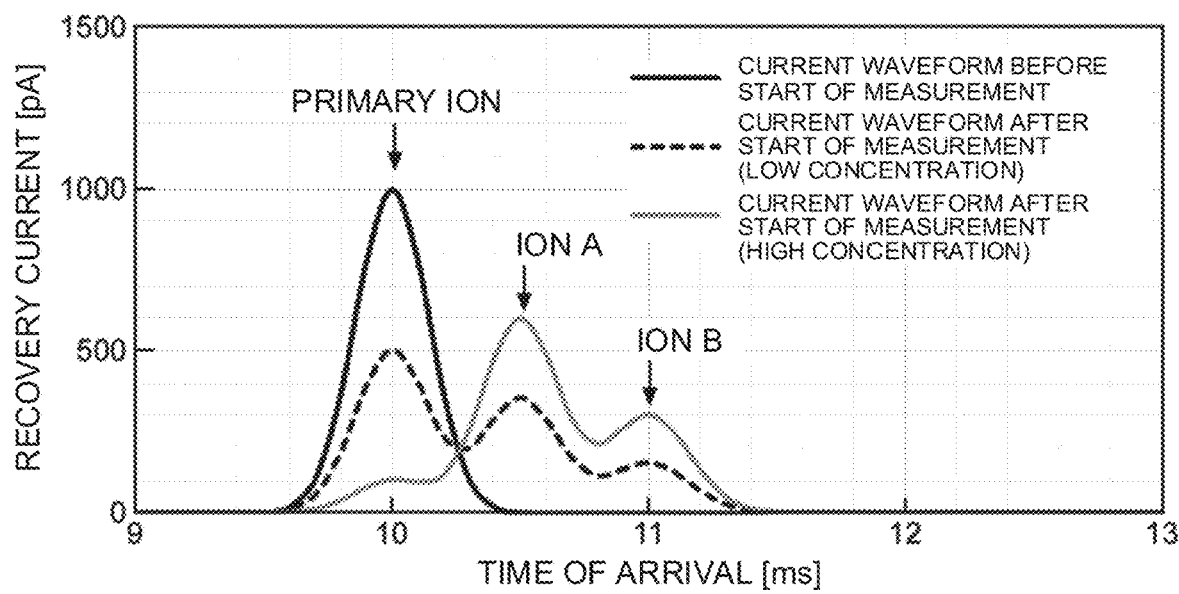
FIG. 10 is a graph illustrating current waveforms of the recovery current.

FIG. 10 illustrates a current waveform before the start of measurement after the calibration process (black solid line), a current waveform after the start of measurement that is measured if the specimen gas contains the component to be detected at a low concentration (black broken line), and a current waveform after the start of measurement that is measured if the specimen gas contains the component to be detected at a high concentration (gray solid line). Such current waveforms are essentially the same in total peak area owing to the feedback control as described above. It is thus possible to continuously make a quantitative measurement in accordance with a certain standard of measurement by performing feedback control based on the total peak area even if the concentration of the component to be detected changes over time or the component itself in the specimen gas has been changed.

Configurations other than those described above are the same as the first embodiment. The description on the first embodiment applies to the second embodiment unless any contradictions occur.

Third Embodiment

In a third embodiment, the controller 12 is so provided as to change a target value for feedback control so as to regulate the measurement sensitivity or the ionization capability of the analysis device 40.

Figure 11:
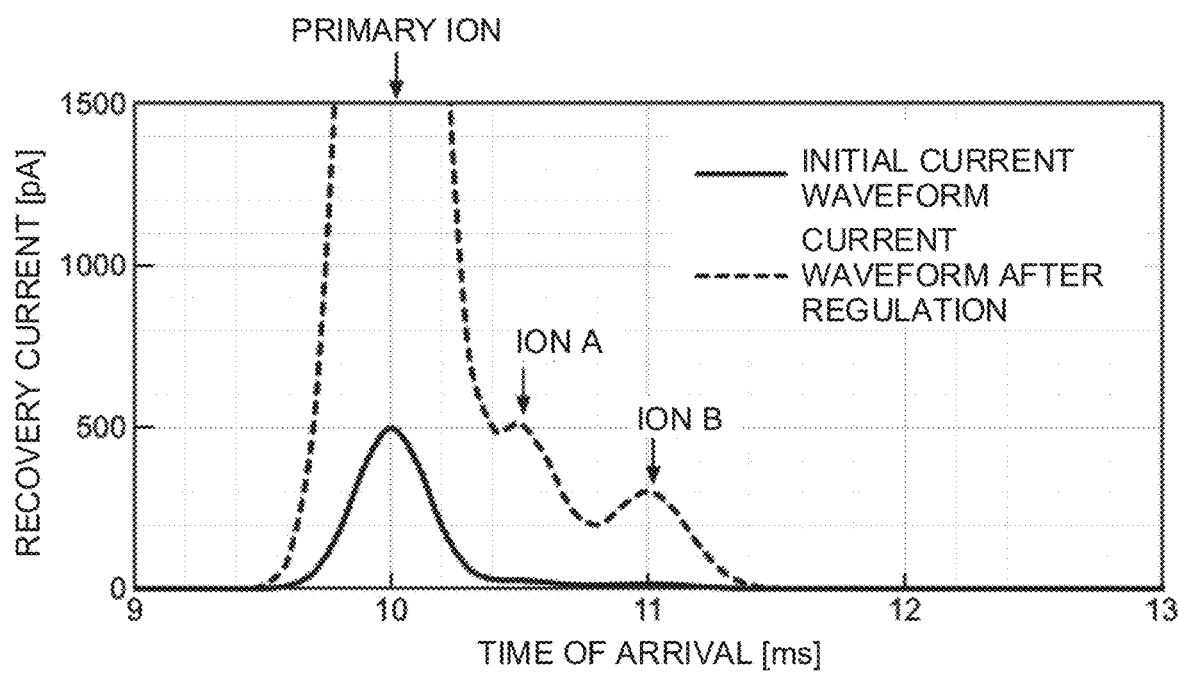
FIG. 11 is a graph illustrating current waveforms of the recovery current.

If the concentration of the component to be detected, which is contained in the specimen gas, is low, a peak of anions derived from the component to be detected may not appear in the current waveform after the start of measurement in an initial phase and the peak of the primary ions may only appear. As an example, such a current waveform as a solid line waveform in FIG. 11 is measured. In that case, the amount of the component to be detected in the specimen gas is extremely slight in itself, so that a peak of anions derived from the component to be detected scarcely appears even if the detection sensitivity of the detection circuit 26 is increased.

In the third embodiment, if a peak of anions derived from the component to be detected does not appear in the current waveform, measurement is repeated with a target value for feedback control (target value of the peak height or the peak area of the peak of the primary ions or target value of the total peak area) being gradually made larger, so as to increase the generation amount of the primary ions in itself and the generation amount of anions derived from the component to be detected that are secondarily generated. Measurement is repeated with the voltage applied to the electron emission element 2 being gradually increased, so as to perform feedback control until a peak other than the peak of the primary ions is detected.

The above target value can be made larger until a broken line waveform in FIG. 11 is measured, for instance.

After a peak of anions derived from the component to be detected has appeared, the detection sensitivity of the detection circuit 26 can be decreased so as to perform such a calibration process as described in the first embodiment. Subsequently, the specimen gas is analyzed with the detection sensitivity of the detection circuit 26 being restored, which makes it possible to make a quantitative analysis of a component that is contained in the specimen gas at a low concentration.

Configurations other than those described above are the same as the first or second embodiment. The description on the first or second embodiment applies to the third embodiment unless any contradictions occur.

Fourth Embodiment

In a fourth embodiment, the controller 12 is so provided as to calculate the concentration of a component to be detected, based on the ratio between the peak height or the peak area of a peak corresponding to primary ions generated by the ionization of an air component and the peak height or the peak area of a peak corresponding to anions generated by the ionization of the component to be detected.

As illustrated in FIG. 10, for instance, the peak height or the peak area for the primary ions is reduced and the peak height or the peak area for anions derived from the component to be detected is increased if the concentration of the component to be detected, which is contained in the specimen gas, changes from a low concentration (black broken line waveform) to a high concentration (gray solid line waveform).

The controller 12 is so provided as to calculate the ratio between the amount of the peak for the primary ions and the amount of a peak for the component to be detected from the peak height or the peak area of each peak and estimate the concentration of the component to be detected from the ratio.

The peaks overlap each other and are, accordingly, hard to separate from each other based on the area. Therefore, on the assumption that each peak follows a normal distribution, an approximate value of the peak area of each peak is calculated from the height and the standard deviation of the relevant peak and a ratio is calculated from approximate values. The relationship between the calculated ratio and the gas concentration is found by a lookup table created on the basis of experimental data collected in advance, an approximate expression presumed based on such lookup table, or the like. The distribution model to be used for the approximation of the peak area is not limited to the normal distribution, and other distribution model, such as Cauchy distribution, is also usable.

Configurations other than those described above are the same as the first through the third embodiments. The description on the first through the third embodiments applies to the fourth embodiment unless any contradictions occur.

Fifth Embodiment

In a fifth embodiment, description is made on the control of the analysis device 40 performed if the concentration of the component to be detected in the specimen gas is high.

Figure 12:
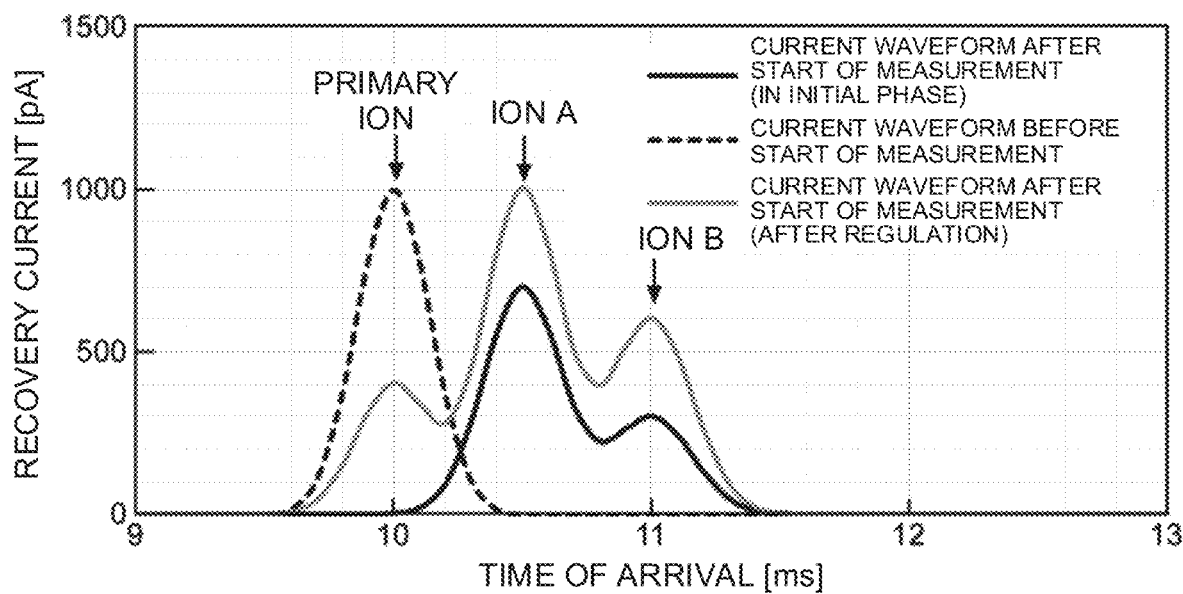
FIG. 12 is a graph illustrating current waveforms of the recovery current.

FIG. 12 illustrates a current waveform before the start of measurement after the calibration process (black broken line), a current waveform after the start of measurement in an initial phase (black solid line), and a current waveform after the start of measurement after the regulation of the voltage applied to the electron emission element 2 (gray solid line).

If the concentration of the component to be detected in the specimen gas is high, the peak of the primary ions does not appear but a peak of the component to be detected only appears in the current waveform on a certain occasion, as is the case with the current waveform illustrated in FIG. 12 with a black solid line. In that case, no hindrance is caused to the component analysis itself of the specimen gas, while it is not possible to estimate the concentration based on the ratio between the peak of the primary ions and a peak of the component to be detected, as described in the fourth embodiment. Such phenomenon results from the fact that molecules of the component to be detected are excessive as compared with the primary ion molecules and, in consequence, the electric charge of the primary ions is thoroughly consumed. Therefore, measurement is repeated to perform feedback control while gradually raising the voltage applied to the electron emission element 2 and increasing thereby the feed amount of the primary ions until the level, where a peak of a specified amount of primary ions remains even if the component to be detected has been ionized, is gained. Subsequently, the concentration of the component to be detected is estimated based on the peak area ratio between the peak of the primary ions and a peak of the component to be detected.

Configurations other than those described above are the same as the first through the fourth embodiments. The description on the first through the fourth embodiments applies to the fifth embodiment unless any contradictions occur.

Sixth Embodiment

While a device for analyzing by drift tube IMS has been described in the first through the fifth embodiments, a device for analyzing by field asymmetric waveform IMS (FAIMS) is described in a sixth embodiment.

Figure 13:
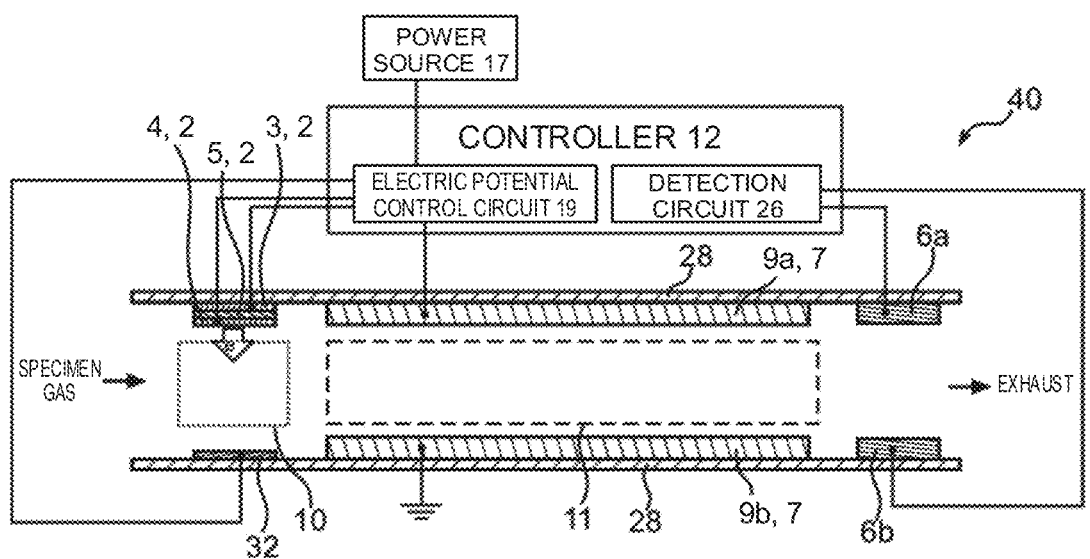
FIG. 13 is a schematic cross-sectional view of an analysis device according to an embodiment of the present invention.
Figure 14:
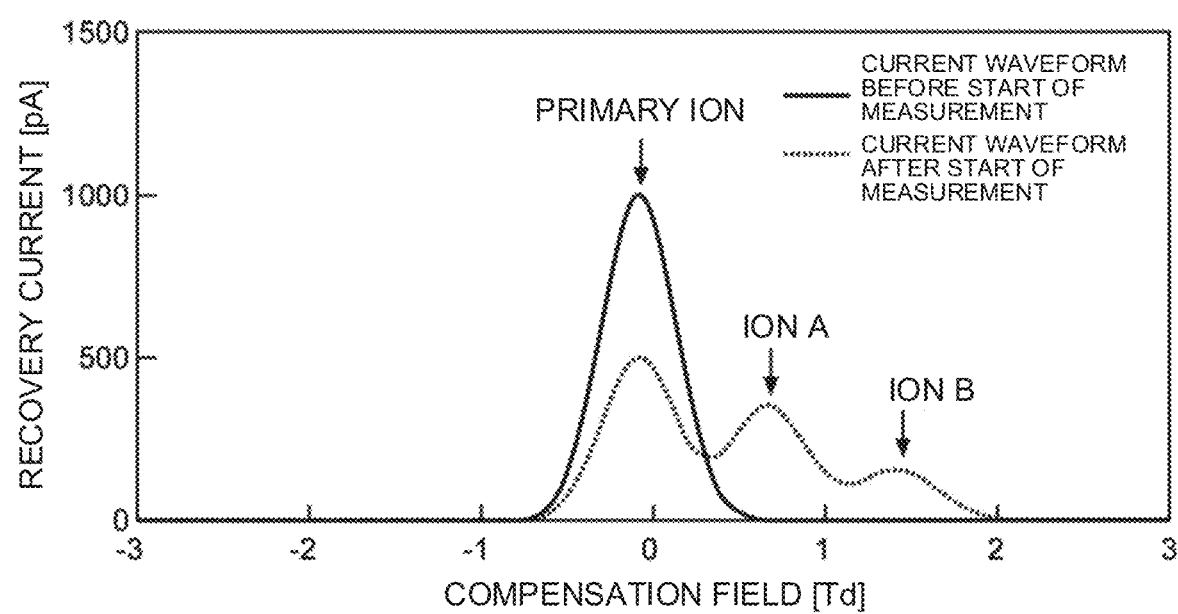
FIG. 14 is a graph illustrating current waveforms of the recovery current.

FIG. 13 is a schematic cross-sectional view of an analysis device 40 according to the present embodiment. FIG. 13 includes a block diagram illustrating an electric configuration of the analysis device 40.

In the analysis device 40 according to the present embodiment, the electron emission element 2 is used to convert a component to be detected that is contained in a carrier gas into anions in the ionization region 10, and the anions are caused, along with the carrier gas, to flow through the ion movement region 11 between parallel plate electrodes (region between the electric field forming electrodes 9a and 9b). The anions having traveled in the ion movement region 11 deliver an electric charge to a collector 6a or 6b and a recovery current is measured by the detection circuit 26.

The analysis device 40 includes a counter electrode 32 so provided as to face the surface electrode 4 of the electron emission element 2. The electric potential of the counter electrode 32 is so regulated by the controller 12 as to exceed the electric potential of the surface electrode 4. By the surface electrode 4 and the counter electrode 32, it is made possible to form an electric field that allows electrons emitted from the electron emission element 2 or anions generated by the electrons to move to the ionization region 10.

The carrier gas to be caused to flow through the ionization region 10 and the ion movement region 11 along with the component to be detected can be air. The carrier gas is preferably air purified with an air purification filter (purified dry air).

In the FAIMS, primary ions are generated from a component of the air as a carrier gas, and anions are generated by the delivery of an electric charge from the primary ions to the component to be detected.

The distance between the electric field forming electrodes 9a and 9b is several ten micrometers to several millimeters (0.01 to 2 mm), and the length of each of the electric field forming electrodes 9a and 9b is several hundred micrometers to several ten millimeters (0.1 to 30 mm).

Between the electric field forming electrodes 9a and 9b, an asymmetric high-frequency voltage (dispersed voltage) and a direct current voltage (compensation voltage) are applied using the controller 12. The dispersed voltage can be applied so that the time average during one period of the waveform may be zero. The voltage is plus/minus several thousand volts (+100 to +2000 V) or so between the electrodes, the field intensity is plus/minus several ten thousand volts per centimeter (+5000 to +40000 V/cm or so), and the frequency is several hundred kilohertzes to several megahertzes (100 kHz to 3 MHz).

Ions contained in a gaseous body flowing through the ion movement region 11 between the electric field forming electrodes 9a and 9b waveringly flow due to the change in polarity of an electric field formed by the dispersed voltage, and change in direction of movement. The ion mobility is constant in a low electric field irrespective of the field intensity, but changes in a high electric field depending on the field intensity. Such change in ion mobility depends on the ion species. Consequently, there arise an ion species that is able to pass through the ion movement region 11 and an ion species that collides with the electric field forming electrodes 9a and 9b and is not able to pass through the ion movement region 11. The ions, which have passed through the ion movement region 11, are detected by the collectors 6a and 6b. The ions having collided with the electric field forming electrodes 9a and 9b are neutralized.

The compensation voltage is a direct current voltage applied between the electric field forming electrodes 9a and 9b, and the direction of movement of ions contained in a gaseous body flowing through the ion movement region 11 changes depending on the magnitude and the polarity of the compensation voltage. Consequently, if the dispersed voltage is fixed and the compensation voltage is timewise scanned in a specified range, change takes place in an ion species that is able to pass through the ion movement region 11 and the current waveform of a recovery current generated by the reception of an electric charge by the collectors 6a and 6b is measured. The scanning range of the compensation voltage is a range of +100 V or so, and the scanning range of the field intensity is a range of +2000 V/cm or so.

In the FAIMS, it is possible, similarly to the first embodiment, to cause the carrier gas (drift gas in the first embodiment) to solely flow and perform a calibration process so as to regulate the voltage applied to the electron emission element 2, and then cause the specimen gas to flow through along with the carrier gas so as to start measurement.

It is also possible, similarly to the second embodiment, to perform feedback control so that the total peak area of the current waveform of the recovery current may be constant.

It is also possible, similarly to the third embodiment, to regulate the measurement sensitivity or the ionization capability by changing a target value for feedback control.

It is also possible, similarly to the fourth embodiment, to calculate the concentration of a component to be detected, based on the ratio between the peak height or the peak area of a peak corresponding to primary ions generated by the ionization of an air component and the peak height or the peak area of a peak corresponding to ions generated by the ionization of the component to be detected.

It is also possible, similarly to the fifth embodiment, to perform feedback control until the level, where the peak of the primary ions remains, is gained.

Configurations other than those described above are the same as the first through the fifth embodiments. The description on the first through the fifth embodiments applies to the sixth embodiment unless any contradictions occur.

What is claimed is:

1. An analysis device comprising an electron emission element, a collector, an electric field former, a power source, and a controller, wherein
    the electron emission element includes a bottom electrode, a surface electrode, and an intermediate layer arranged between the bottom electrode and the surface electrode,
    the power source and the controller allow application of a voltage between the bottom electrode and the surface electrode,
    the electric field former forms an electric field in an ion movement region where anions directly or indirectly generated by electrons emitted from the electron emission element move toward the collector,
    the collector and the controller allow measurement of a current waveform of an electric current made to flow by arrival of anions at the collector, and
    the controller regulates, based on the current waveform, a voltage applied between the bottom electrode and the surface electrode.

2. The analysis device according to claim 1, wherein
    the current waveform has a peak corresponding to an ion species arriving at the collector, and
    the controller regulates the voltage applied between the bottom electrode and the surface electrode to cause a peak height or a peak area of a peak corresponding to primary ions generated by ionization of an air component to approach a particular target value.

3. The analysis device according to claim 1, wherein
    the current waveform has a peak corresponding to an ion species arriving at the collector, and
    the controller regulates the voltage applied between the bottom electrode and the surface electrode to cause a total peak area of the current waveform to approach a particular target value.

4. The analysis device according to claim 3, wherein the controller changes the particular target value to regulate measurement sensitivity or ionization capability.

5. The analysis device according to claim 1, further comprising an electrostatic gate electrode, wherein
    the electrostatic gate electrode is arranged between the ion movement region and an ionization region where anions are directly or indirectly generated by electrons emitted from the electron emission element, and
    the electrostatic gate electrode and the controller allow control of an electric potential of the electrostatic gate electrode to control feed of anions generated in the ionization region to the ion movement region.

6. The analysis device according to claim 5, further comprising a specimen feeder that feeds a specimen gas to the ionization region, wherein the controller regulates the voltage applied between the bottom electrode and the surface electrode before starting feed of the specimen gas to the ionization region.

7. The analysis device according to claim 5, further comprising a specimen feeder that feeds a specimen gas to the ionization region, wherein
the controller regulates the voltage applied between the bottom electrode and the surface electrode after starting feed of the specimen gas to the ionization region.

8. The analysis device according to claim 7, wherein the controller raises the voltage applied between the bottom electrode and the surface electrode if the current waveform has a peak corresponding to ions generated by ionization of the specimen gas and does not have a peak corresponding to primary ions generated by ionization of an air component.

9. The analysis device according to claim 5, further comprising a drift gas feeder and an exhaust port, wherein
the drift gas feeder and the exhaust port cause a drift gas to flow in the ion movement region from a collector side toward a side of the electrostatic gate electrode.

10. The analysis device according to claim 1, wherein
the current waveform has a peak corresponding to an ion species arriving at the collector, and
the controller calculates a concentration of a component to be detected, based on a ratio between a peak height or a peak area of a peak corresponding to primary ions generated by ionization of an air component and a peak height or a peak area of a peak corresponding to ions generated by ionization of the component to be detected.

* * * * *